(12) United States Patent
Kalinski

(10) Patent No.: US 7,083,293 B2
(45) Date of Patent: Aug. 1, 2006

(54) MULTIPLE COLOR TEMPERATURE VIDEO, TASK OR READING LIGHT SYSTEM

(76) Inventor: Arthur A. Kalinski, 3820 Fenway Crossing, Marietta, GA (US) 30062-6921

( * ) Notice: Subject to any disclaimer, the term of this patent is extended or adjusted under 35 U.S.C. 154(b) by 7 days.

(21) Appl. No.: 10/800,194

(22) Filed: Mar. 12, 2004

(65) Prior Publication Data

US 2004/0179360 A1    Sep. 16, 2004

Related U.S. Application Data

(60) Provisional application No. 60/455,105, filed on Mar. 14, 2003.

(51) Int. Cl.
*F21V 7/00* (2006.01)

(52) U.S. Cl. .................. 362/11; 362/225; 362/224; 362/18; 362/16

(58) Field of Classification Search ............... 362/225, 362/11, 18, 16, 2, 3, 13, 224
See application file for complete search history.

(56) References Cited

U.S. PATENT DOCUMENTS

| | | | | |
|---|---|---|---|---|
| 3,757,103 A | * | 9/1973 | Walter | 362/2 |
| 4,183,077 A | * | 1/1980 | Arnold | 362/224 |
| 4,443,837 A | * | 4/1984 | Migliori et al. | 362/396 |
| 4,633,374 A | * | 12/1986 | Waltz et al. | 362/17 |
| 5,381,322 A | * | 1/1995 | Humphreys | 362/220 |
| 5,890,793 A | * | 4/1999 | Stephens | 362/225 |
| 6,109,757 A | * | 8/2000 | Stephens | 362/11 |
| 6,176,598 B1 | * | 1/2001 | Seligman et al. | 362/352 |
| 6,616,307 B1 | * | 9/2003 | Haenen et al. | 362/341 |

FOREIGN PATENT DOCUMENTS

JP        08293391 A  * 11/1996

OTHER PUBLICATIONS

Wikipedia, "Color Temperature", http://.en.wikipedia.org/wiki/Color-temperature.*
GE Lighting, www.gelighting.com, GE Consumer and Industrial Lighting, "Selecting the Best Color Lamp"; "Color Rendering".*

* cited by examiner

*Primary Examiner*—Stephen Husar
*Assistant Examiner*—Anabel Ton
(74) *Attorney, Agent, or Firm*—George R. Reardon

(57) ABSTRACT

A selectable lighting system and method that uses multiple cool burning compact fluorescent light bulbs of different color temperatures to provide lighting that is a mix of different color temperatures that can be selected and/or mixed to illuminate subjects of video or photographic recording as desired by the videographer. The mix of different color temperature bulbs also makes this lighting system very beneficial as a reading light, a general purpose work light or detail work task light.

2 Claims, 26 Drawing Sheets

MULTIPLE COLOR TEMPERATURE VIDEO, TASK OR READING LIGHT SYSTEM

Claim is hereby made for the benefit of U.S. Provisional Application No. 60/455,105 filed Mar. 14, 2003 incorporated herein by reference.

BACKGROUND OF THE INVENTION

This invention relates to lighting systems, and in particular, selectable lighting systems that use multiple cool burning compact fluorescent light bulbs of different color temperatures to provide lighting that is a mix of different color temperatures that can be selected and/or mixed to illuminate subjects of video or photographic recording. Additionally, this invention relates to lighting systems that provide a mix of different color temperature bulbs to create lighting that is very beneficial as a reading light, a general purpose work light or detail work task light by making it easier for the human eye to focus on close objects for detailed work or reading.

Every light source produces radiation of certain frequencies or array of frequencies ranging from ultra violet through the visible spectrum colors of the rainbow to infrared. A candle produces light across the entire visible spectrum but it produces more light in the red, orange and yellow frequencies. A typical office fluorescent light produces light across the entire visible spectrum but it produces more light in the blue and green frequencies which results in a light that is "cooler" looking than candlelight. A laser light source differs from most other light sources in that it produces coherent light, or light of one frequency.

By experimenting with a red laser I discovered that the part of an object illuminated by the laser had a grainy look and the grains appeared to be in motion. I learned that this was due to the human eye's inability to focus on one frequency of light. The human eye works best in the mixed frequencies of daylight. I experimented to see if this could have implications for other lighting sources and have found that it does.

I found that mixing several light sources, of different frequency spectrums, from slightly different positions, levels out the resultant lighting which reduces the effect of the color spectrum peaks. This provides balanced lighting that mimics natural daylight more accurately. As a result, the human eye has the ability to focus on detail more easily. This also reduces eye strain and fatigue. This lighting system has the additional advantage of not being a fire or burn hazard that is typical of incandescent or halogen lighting since fluorescent bulbs are much cooler to the touch.

Other known prior art includes U.S. Pat. No. 5,285,356, issued to Skene, U.S. Pat. No. 6,062,706, issued to Owen, U.S. Pat. No. 6,554,439, issued to Teicher, U.S. Pat. No. 4,956,751, issued to Kano, and U.S. Pat. No. 3,825,335, issued to Reynolds.

While these patents and other previous devices have made an effort toward creating optimum lighting for a variety of purposes, none have provided for a portable, selectable lighting system that is operable for both professional and personal use.

Therefore, a need exists for a device and a system which allows the user to create variable lighting for a variety of purposes. Additionally, the need exists for this device and system to be portable.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information does not teach or render obvious, singly or when considered in combination, the inventor's claimed invention.

BRIEF SUMMARY OF THE INVENTION

The general purpose of the present invention, which will be described subsequently in greater detail, is to provide a new lighting system which has many of the advantages of the lighting systems mentioned heretofore and many novel features that result in a new lighting system which is not anticipated, rendered obvious, suggested, or even implied by any of the prior art lighting systems, either alone or in any combination thereof.

One objective of the present invention is to provide a source of light that is selectable in both brightness and color temperature.

Another objective of the present invention is to provide a source of light that is portable.

Another objective of the present invention is to provide a source of light that is cooler than using all incandescent and/or halogen bulbs.

The present invention is comprised of a selectable light source. The present invention is further comprised of a support, such as a tripod. The present invention is further comprised of a carrying case. The present invention is further comprised of a reflector and/or a diffuser.

Bulbs used in this system can be a mix of colors including: DAYLIGHT 6400K, TRUETONE 5000K, COOL WHITE 4100K, WARM WHITE 3700K, pink, "Blacklight" (ultra-violet), yellow, red, etc., where K=Kelvin color temperature. The user can determine which combination of wattage and color bulbs will serve the purpose best. While incandescent bulbs can also be used in this lamp, the heat and wattage will be greater and they are not recommended. Although as few as two bulbs can be used to get the frequency leveling effect, I found that the best results for task lighting and reading resulted from using four bulbs simultaneously: DAYLIGHT 6400K, TRUETONE 5000K, COOL WHITE 4100K and WARM WHITE 3700K. Additional bulbs could be used to achieve different lighting effects.

In some applications the 60 hz frequency of a typical fluorescent lamp could cause flickering of the image with certain video or photographic devices. In such a case, bulbs and a power supply that is of a frequency that is variable or different than 60 hz could be used to eliminate this flickering.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing-abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Further objects and advantages of the present invention will be apparent from the following detailed description of a presently preferred embodiment which is illustrated schematically in the accompanying drawings.

BRIEF DESCRIPTION OF THE SEVERAL VIEWS OF THE DRAWING

Other advantages and features of the invention are described with reference to exemplary embodiments, which are intended to explain and not to limit the invention, and are illustrated in the drawings in which.

DETAILED DESCRIPTION OF THE INVENTION

Figure 1:
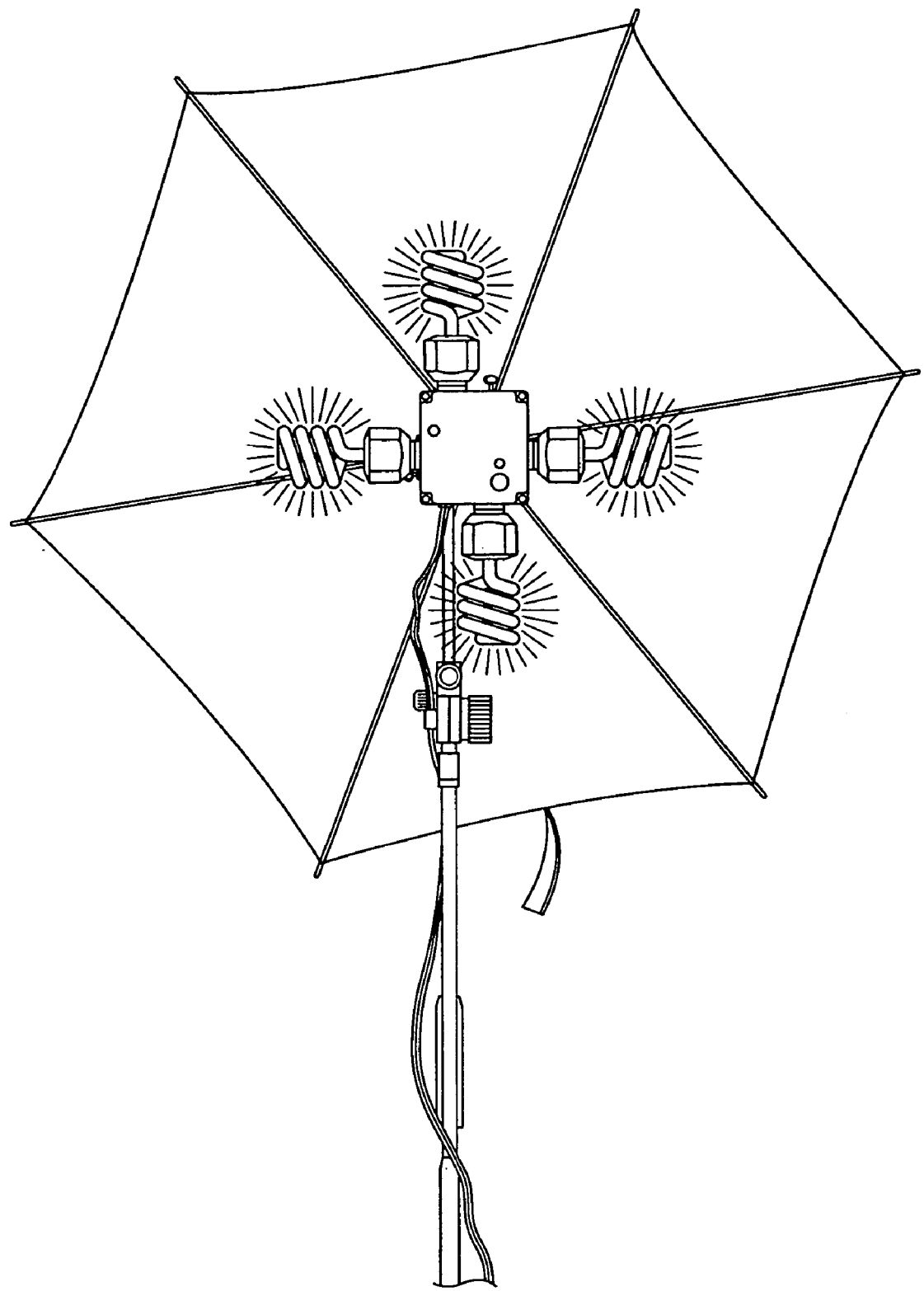
FIG. 1 is a front view of the invention, without the front diffuser.
Figure 2:
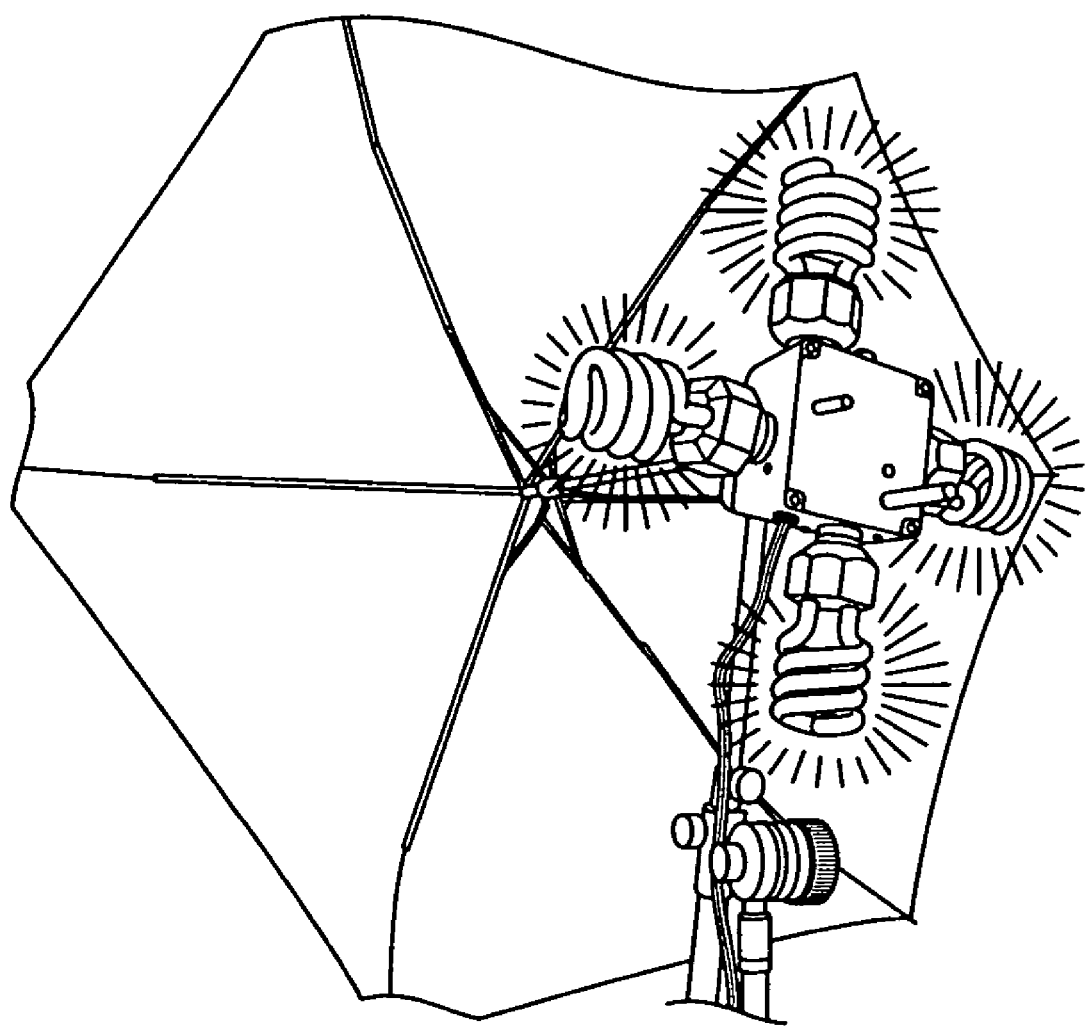
FIG. 2 is a front view of the invention from a diagonal perspective.
Figure 3:
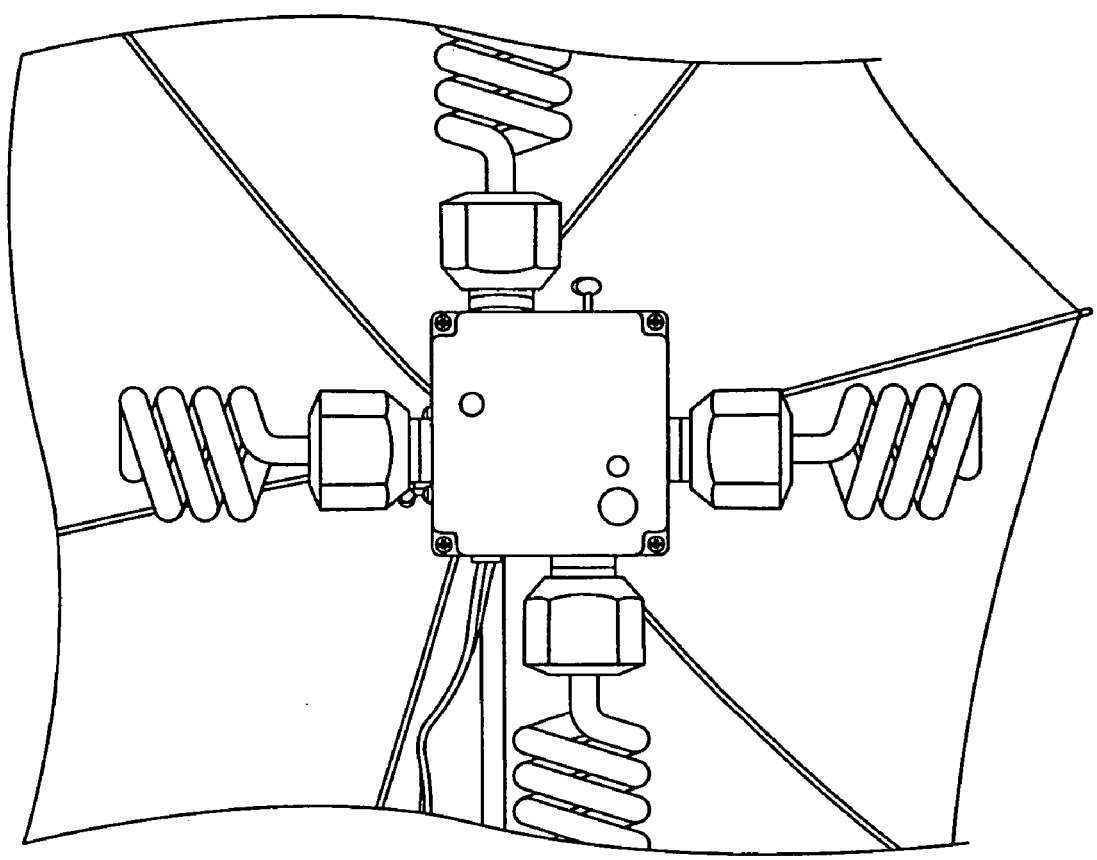
FIG. 3 is a front view of the invention, showing more detail.
Figure 4:
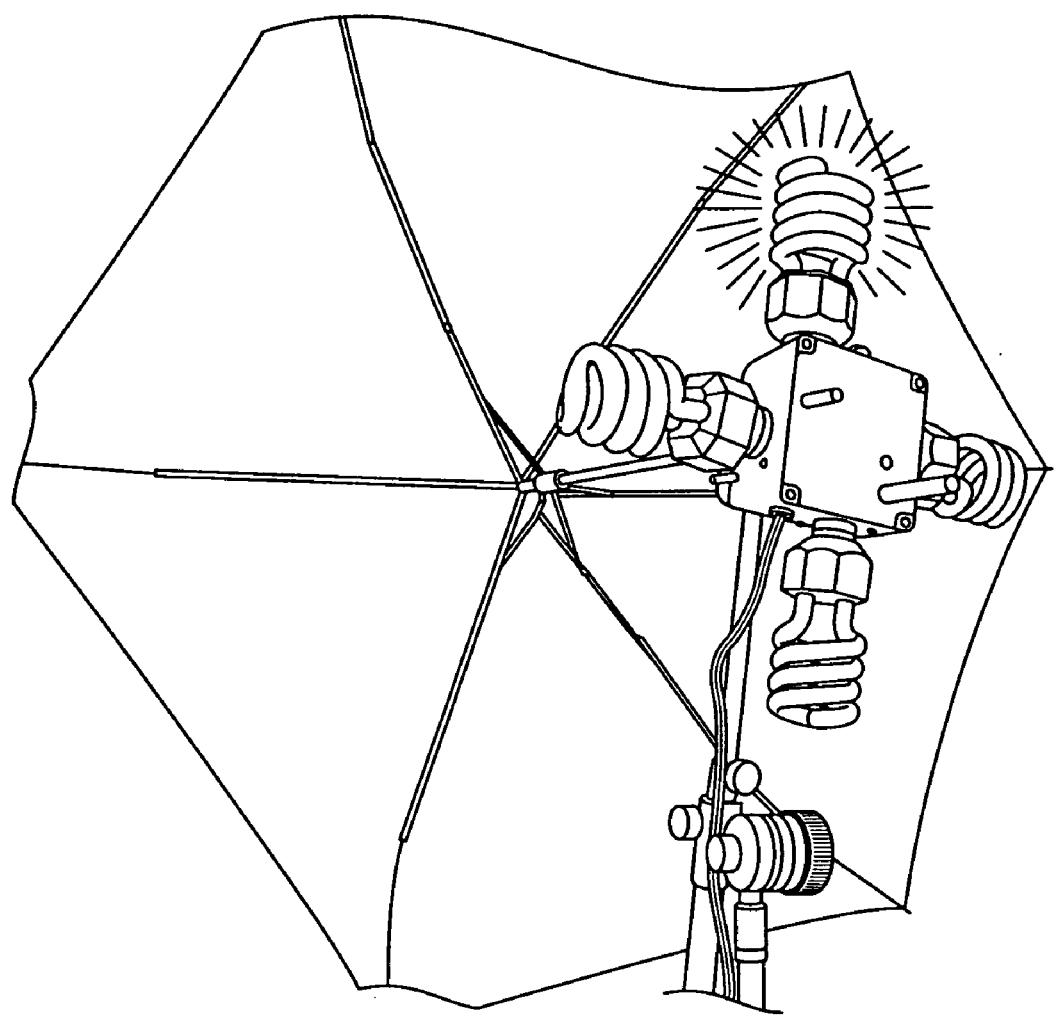
FIG. 4 is a front view of the invention from a diagonal perspective.
Figure 5:
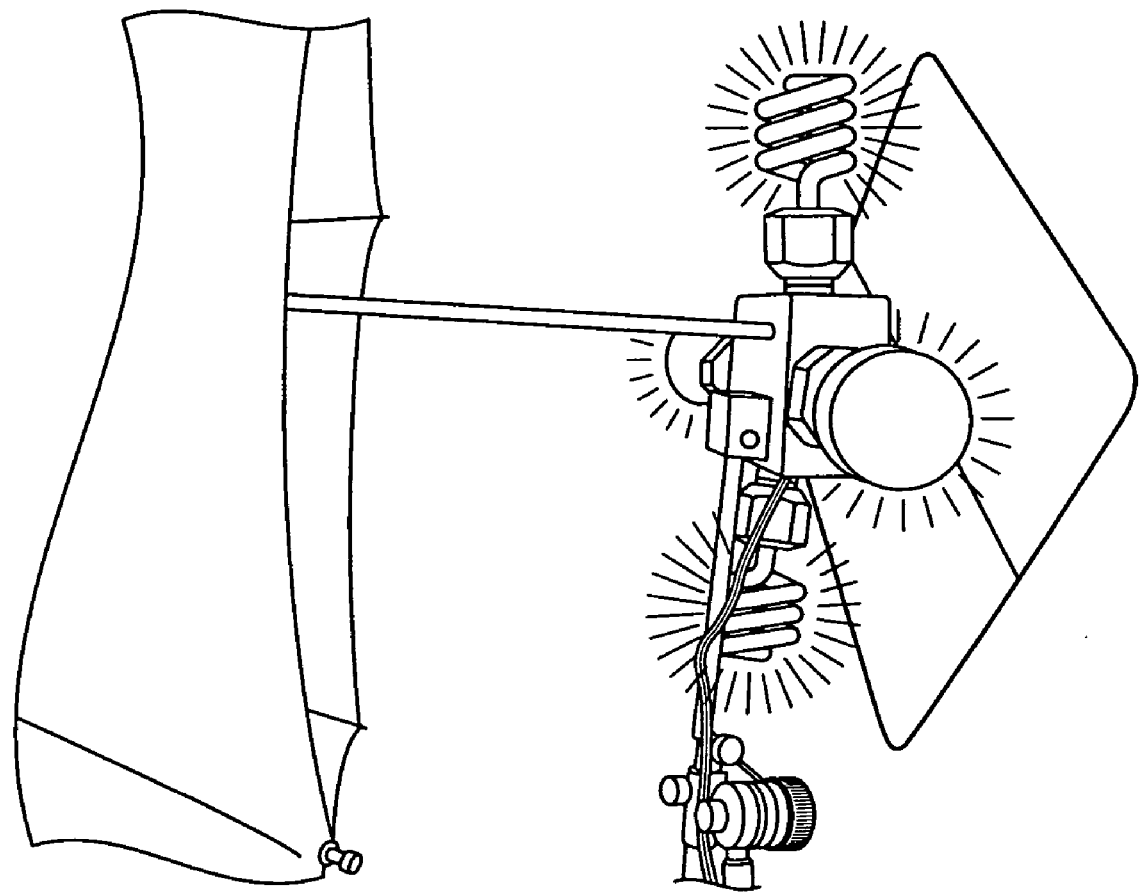
FIG. 5 is a left side view of the invention showing the umbrella reflector and front diffuser.
Figure 6:
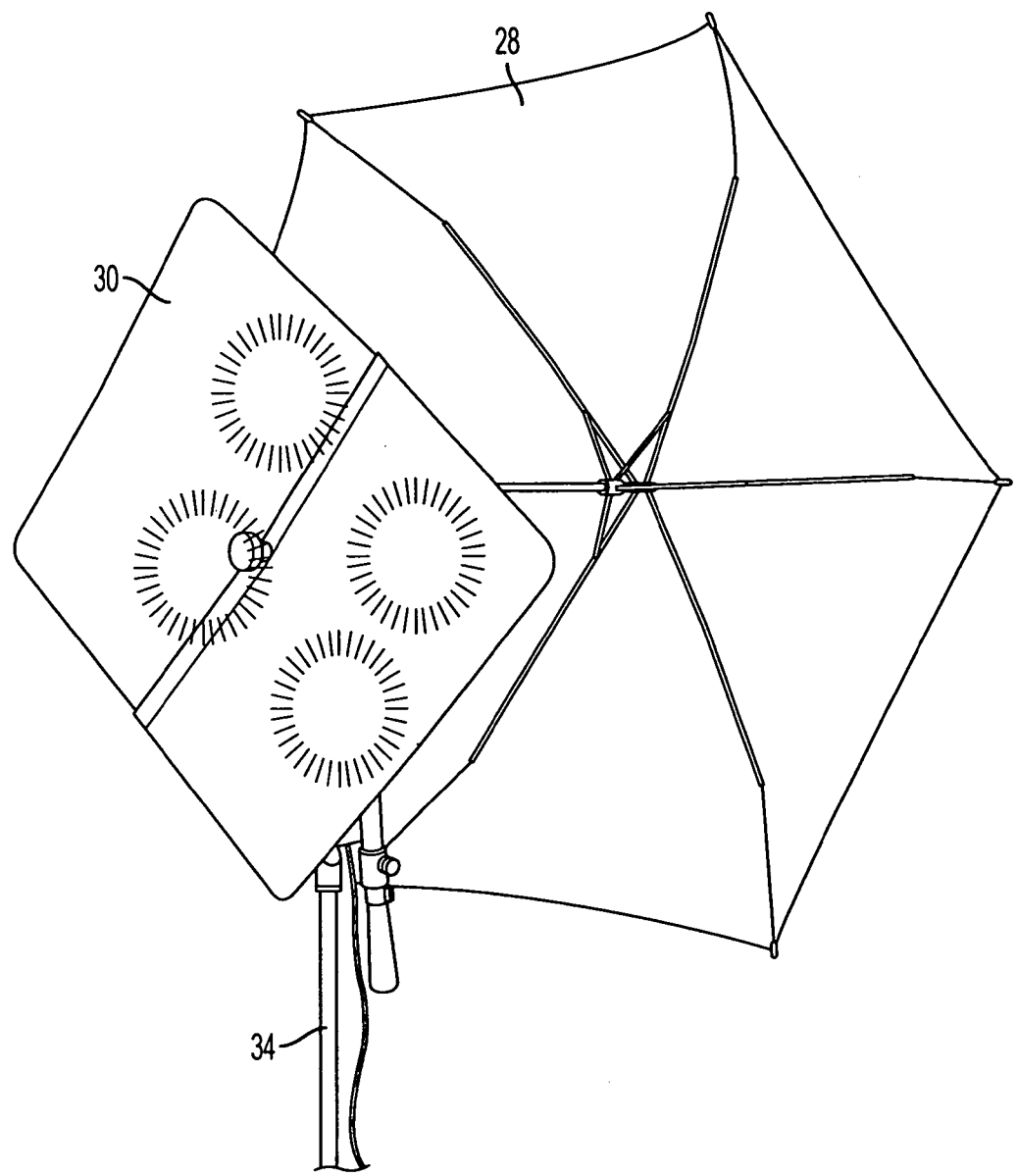
FIG. 6 is a perspective view of the invention, showing the umbrella reflector and front diffuser.
Figure 7:
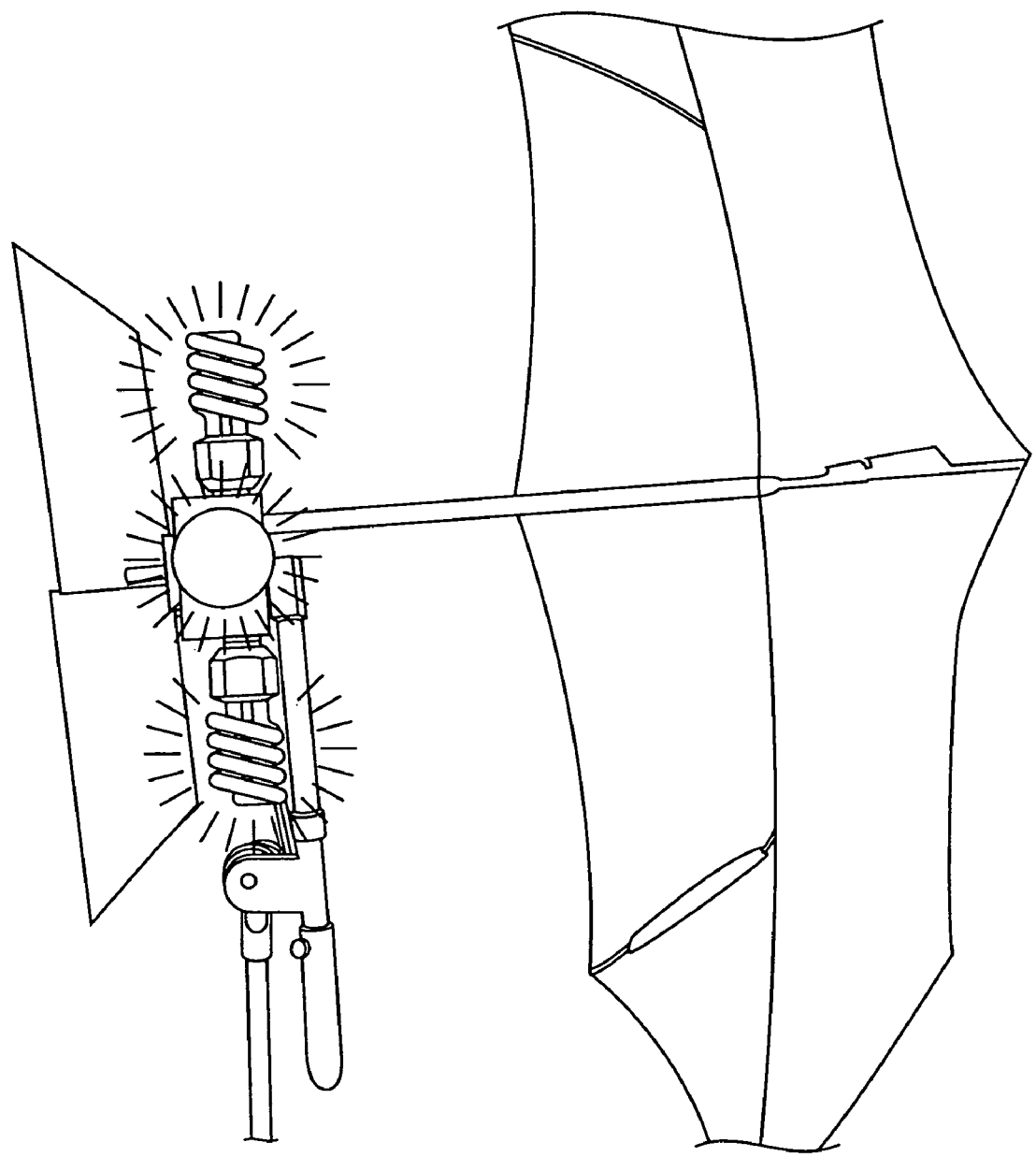
FIG. 7 is a right side view of the invention showing the umbrella reflector and front diffuser.
Figure 8:
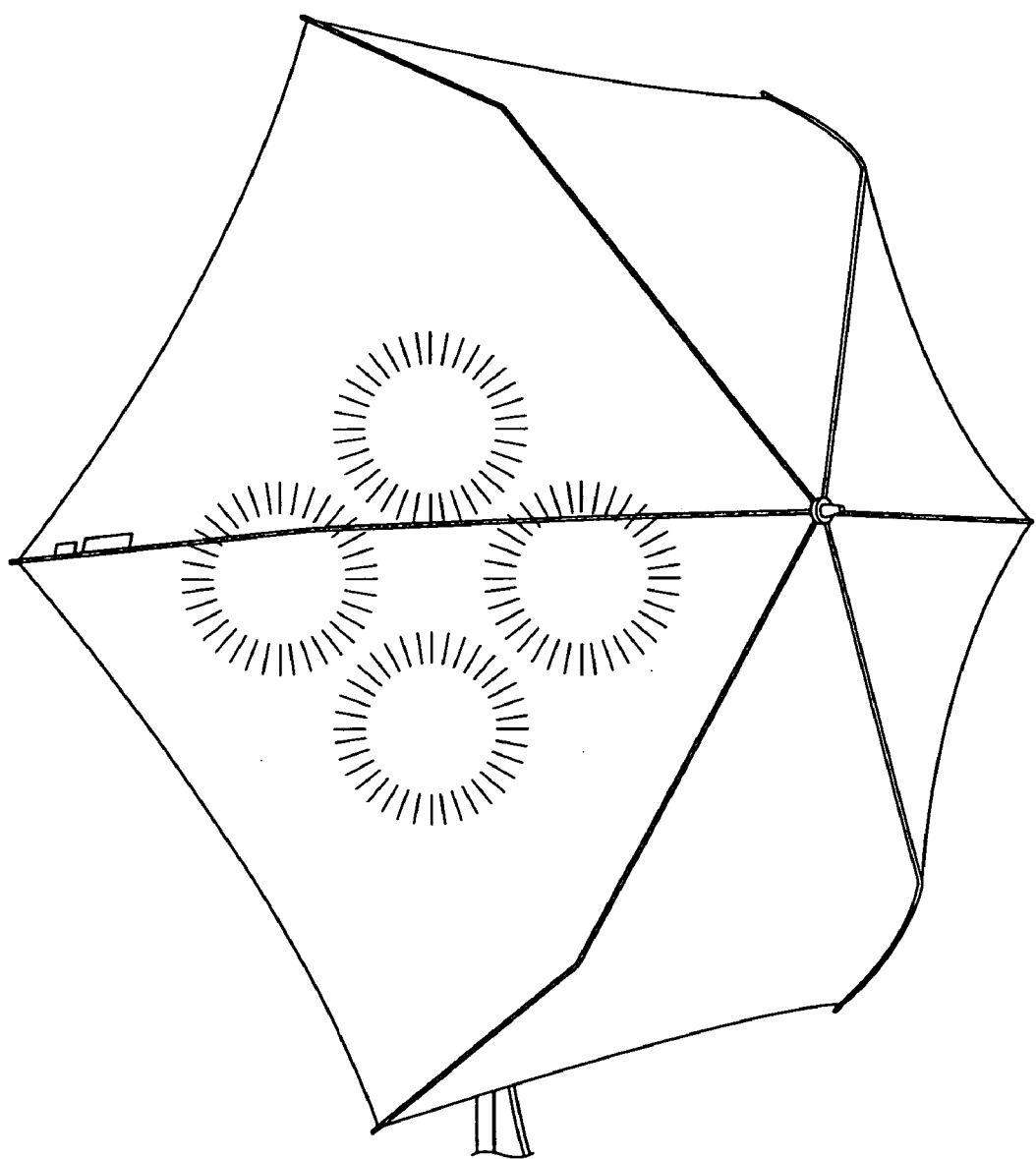
FIG. 8 is a back perspective view of the invention showing the lights shining through the umbrella reflector.
Figure 9:
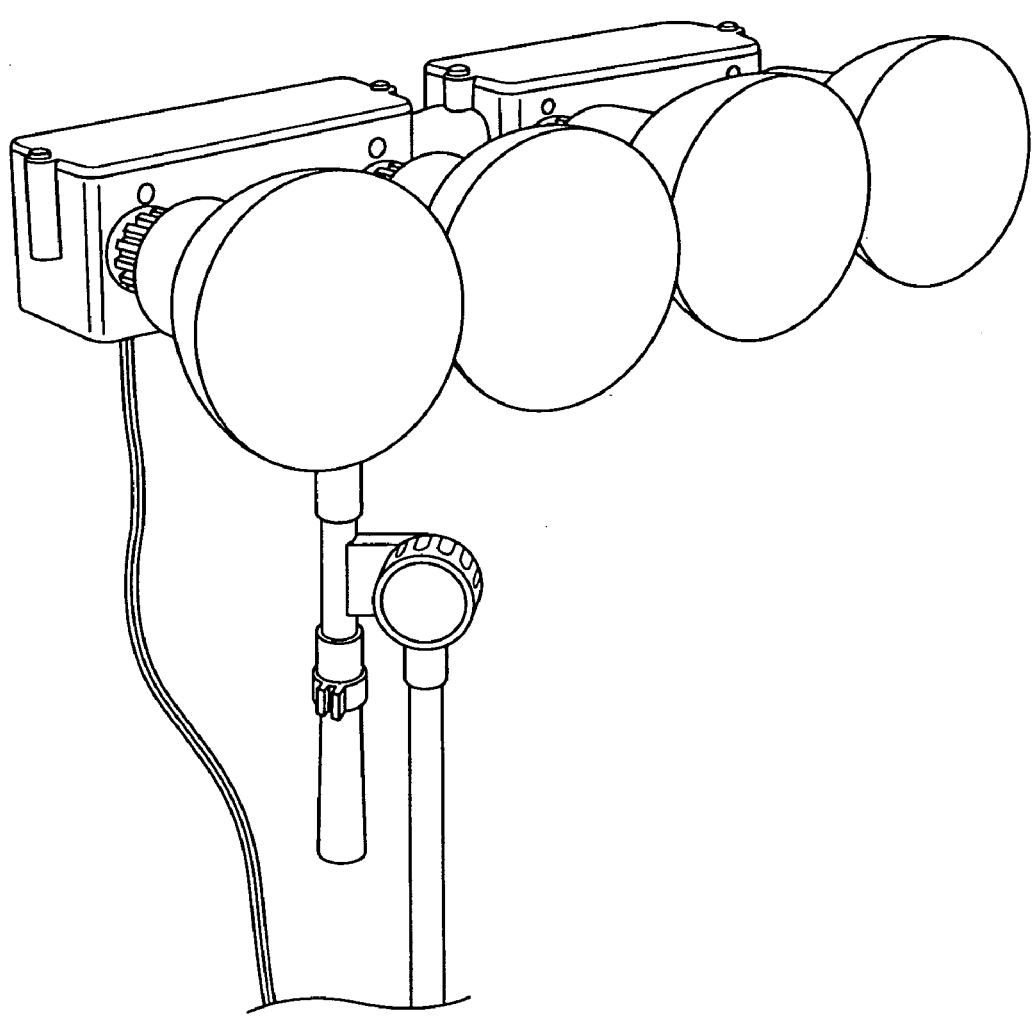
FIG. 9 shows a front view of another embodiment of the selectable light source.
Figure 10:
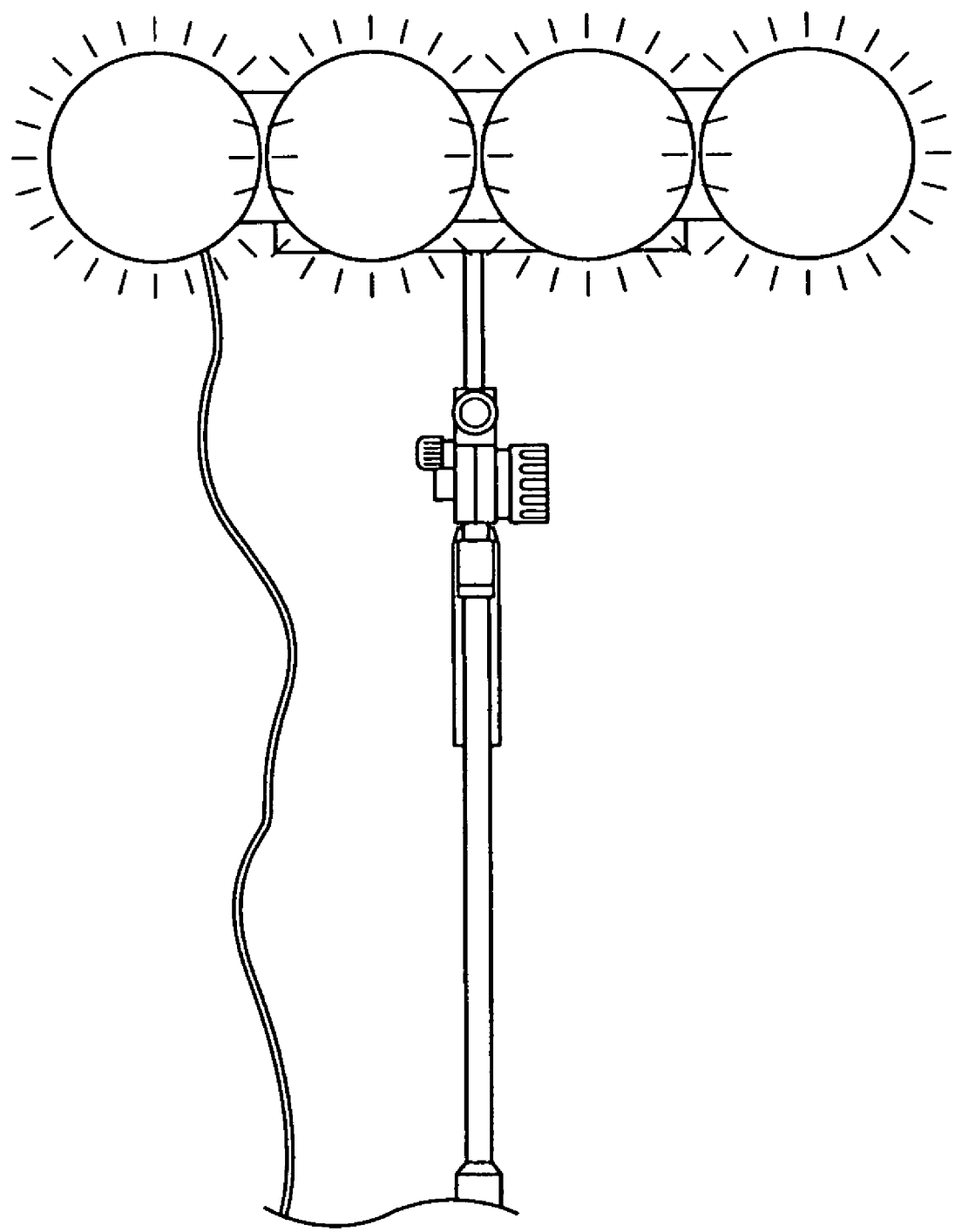
FIG. 10, shows a front view of another embodiment of the selectable light source with the lamps shining.
Figure 11:
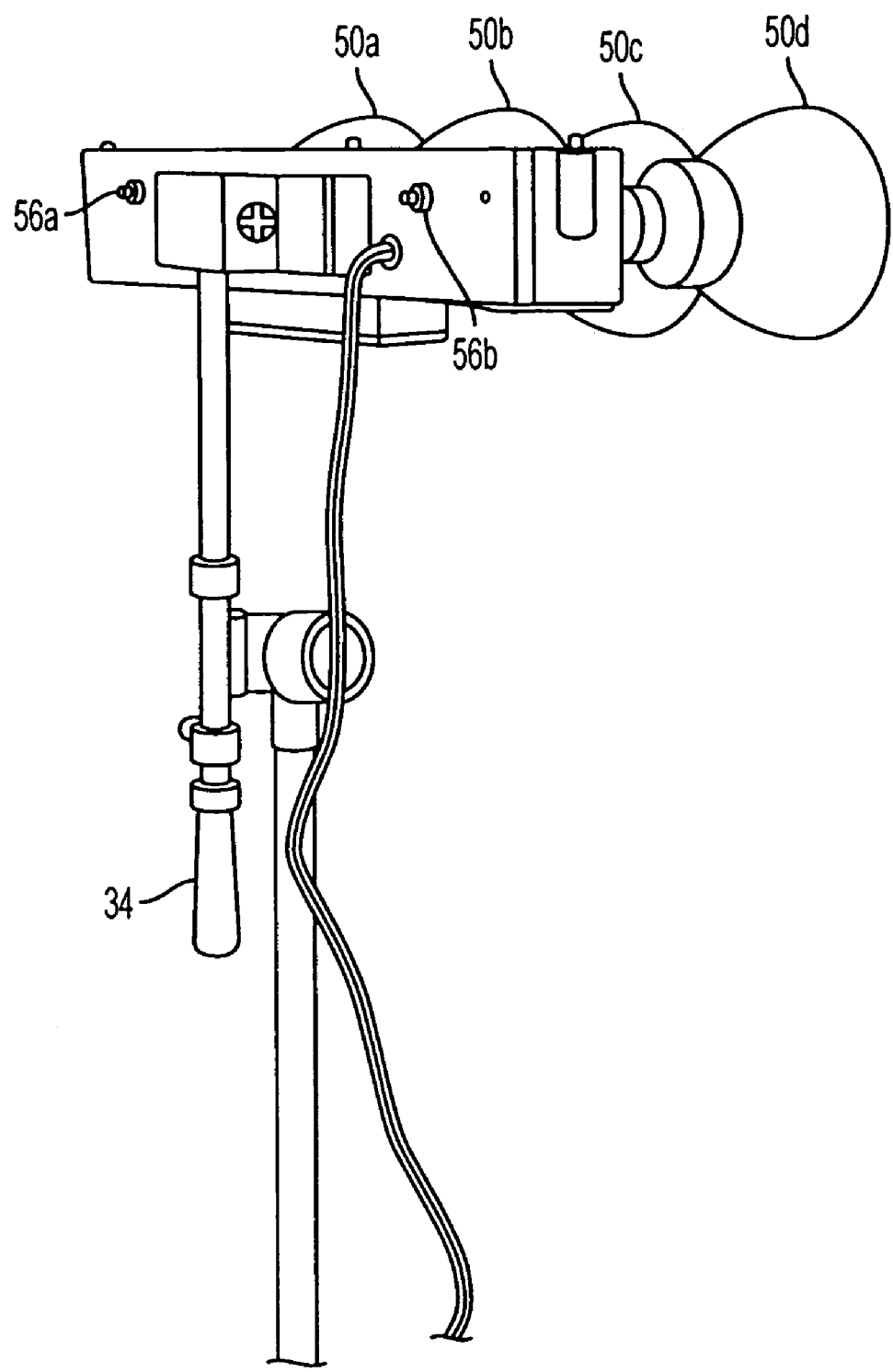
FIG. 11 is a back perspective view of another embodiment of the selectable light source.
Figure 12:
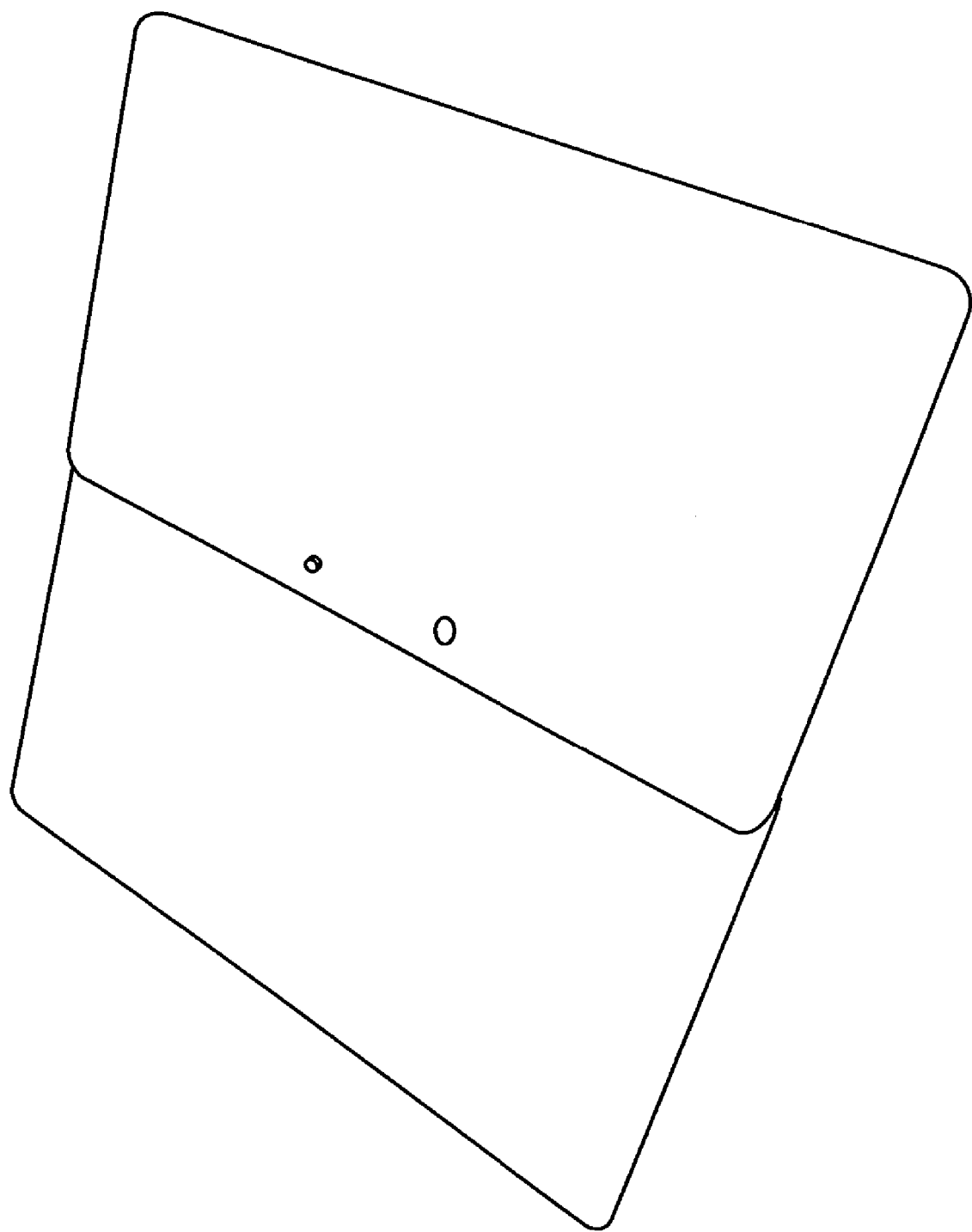
FIG. 12 is a front perspective view of the front diffuser.
Figure 13:
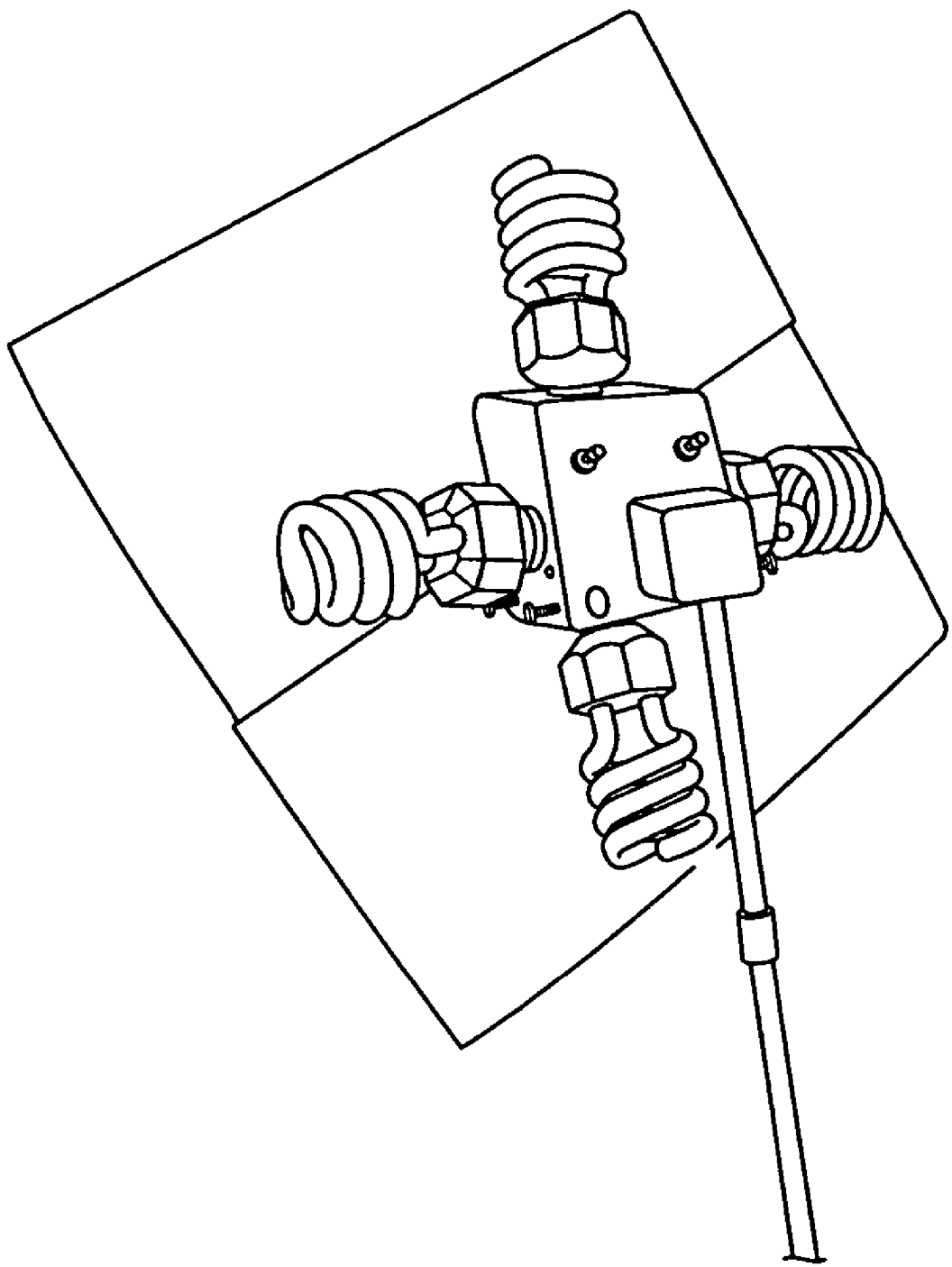
FIG. 13 is a back perspective view of the front diffuser and selectable light source.
Figure 14:
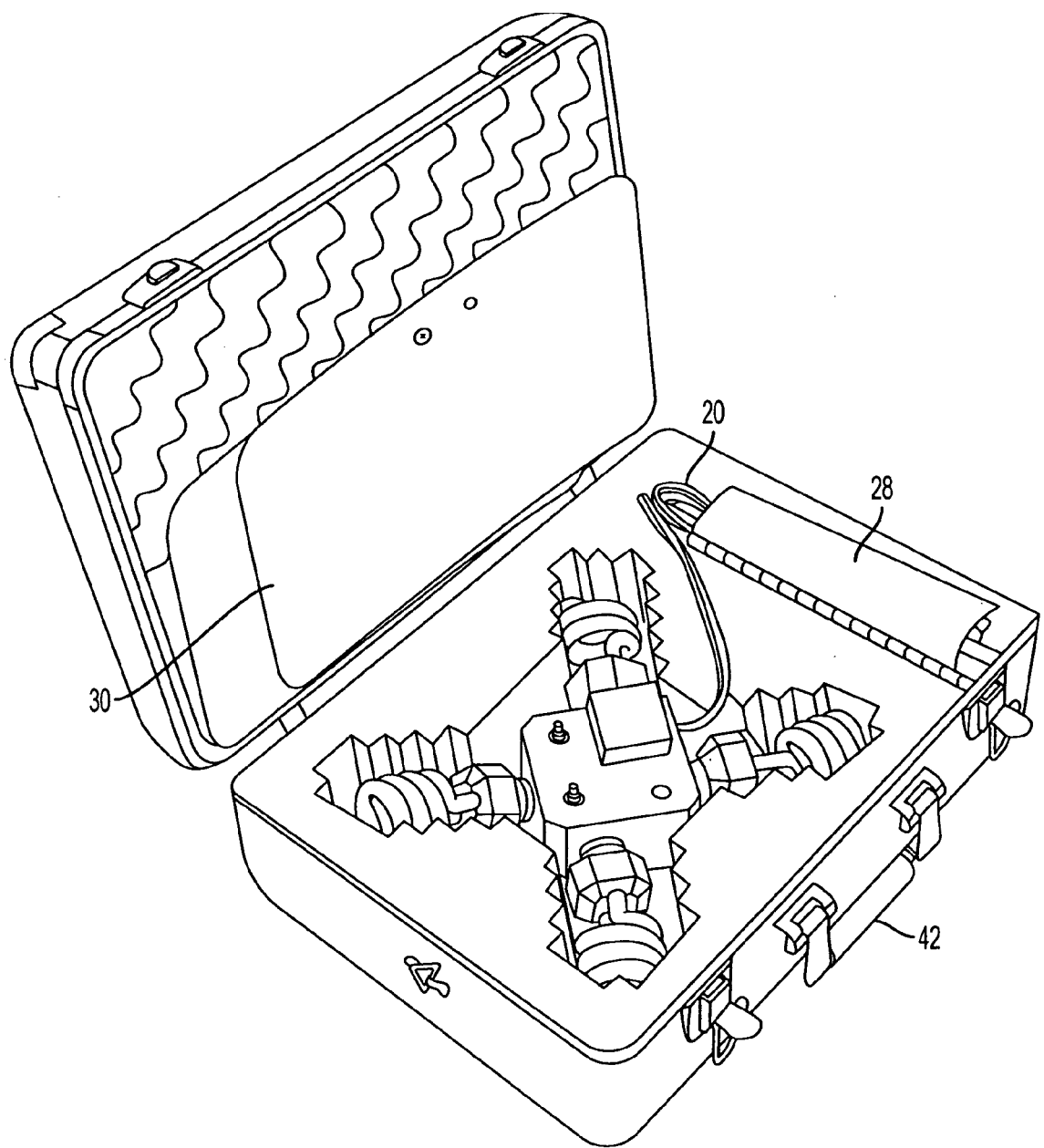
FIG. 14 is a top perspective view of the carrying case for the selectable light source, front diffuser, power cord and umbrella reflector.
Figure 15:
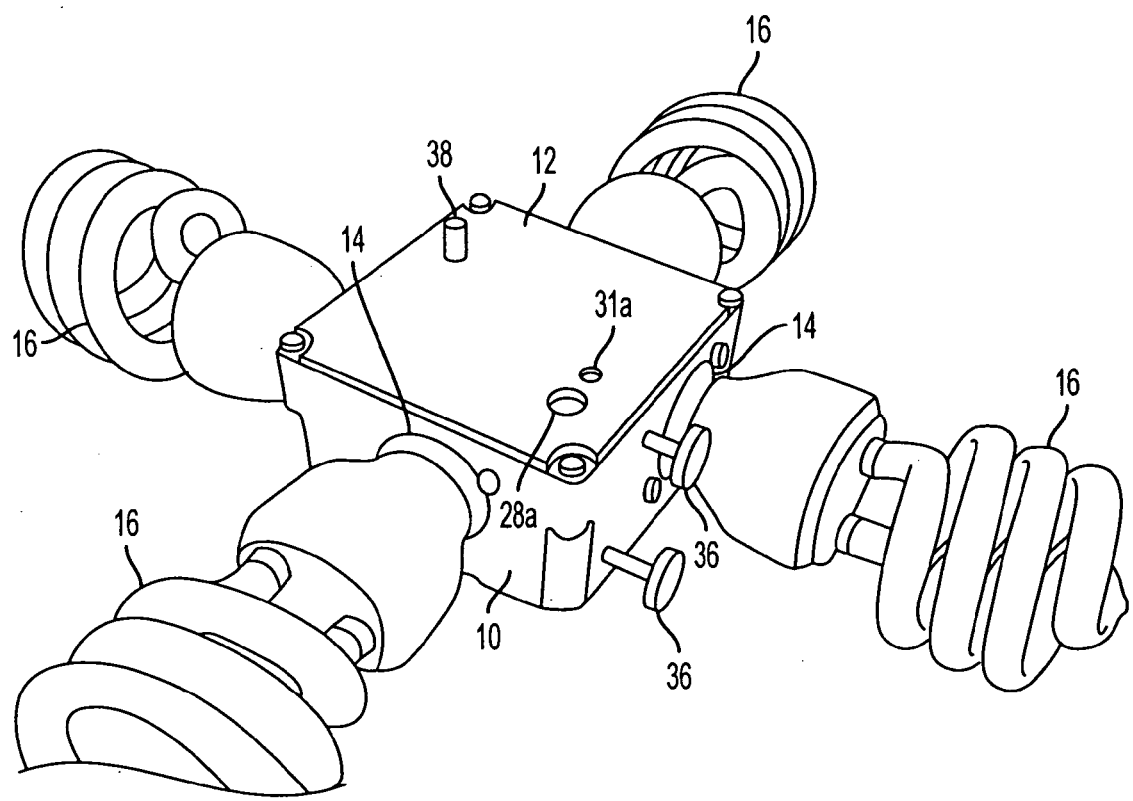
FIG. 15 is a front perspective view of the selectable light source showing detail of the parts.
Figure 16:
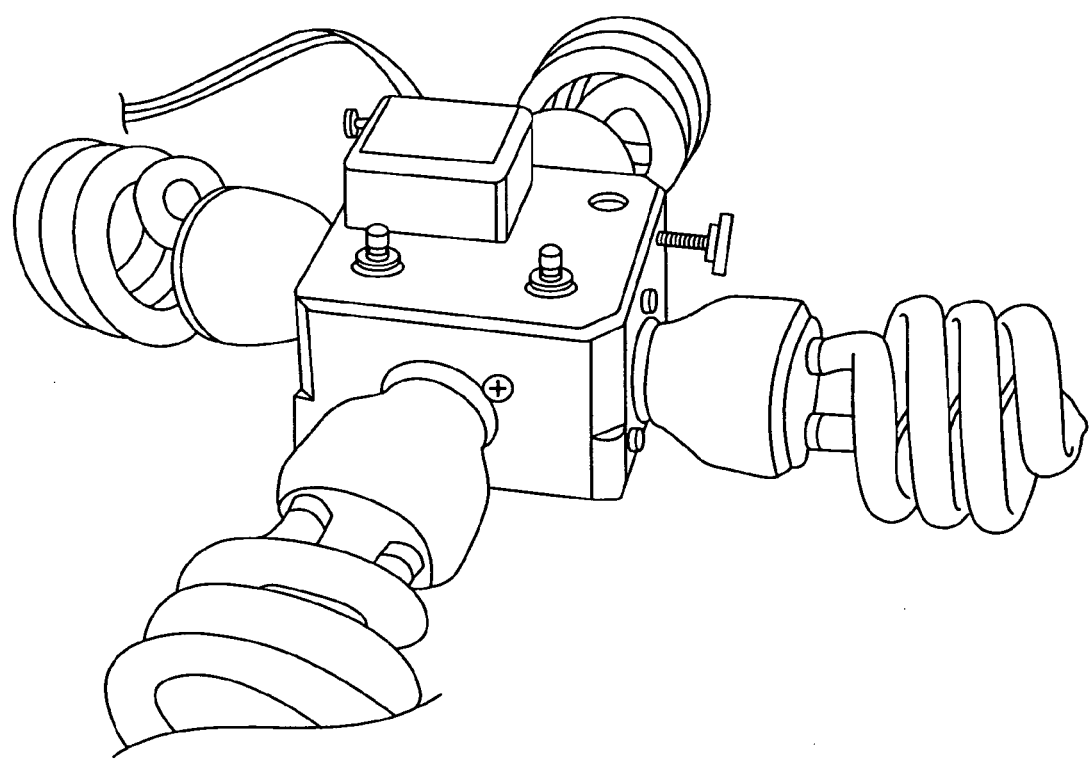
FIG. 16 is a back top perspective view of the selectable light source showing detail of the parts.
Figure 17:
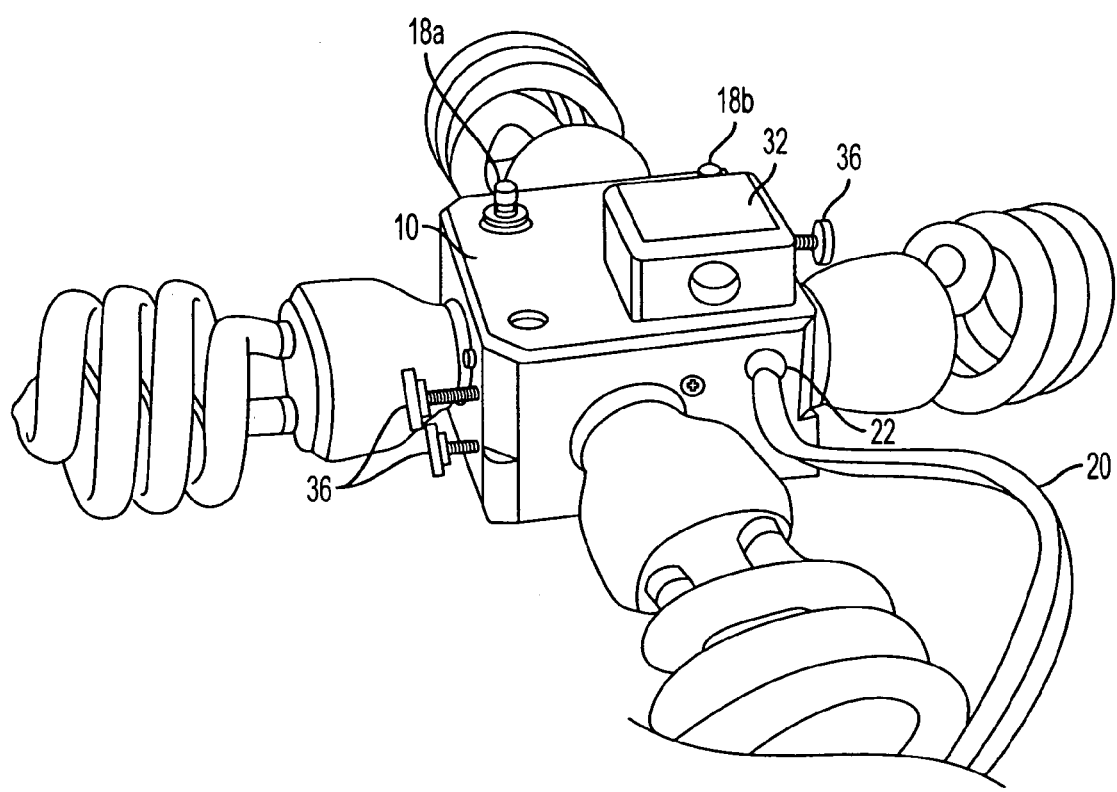
FIG. 17 is a back bottom perspective view of the selectable light source showing detail of the parts.
Figure 18:
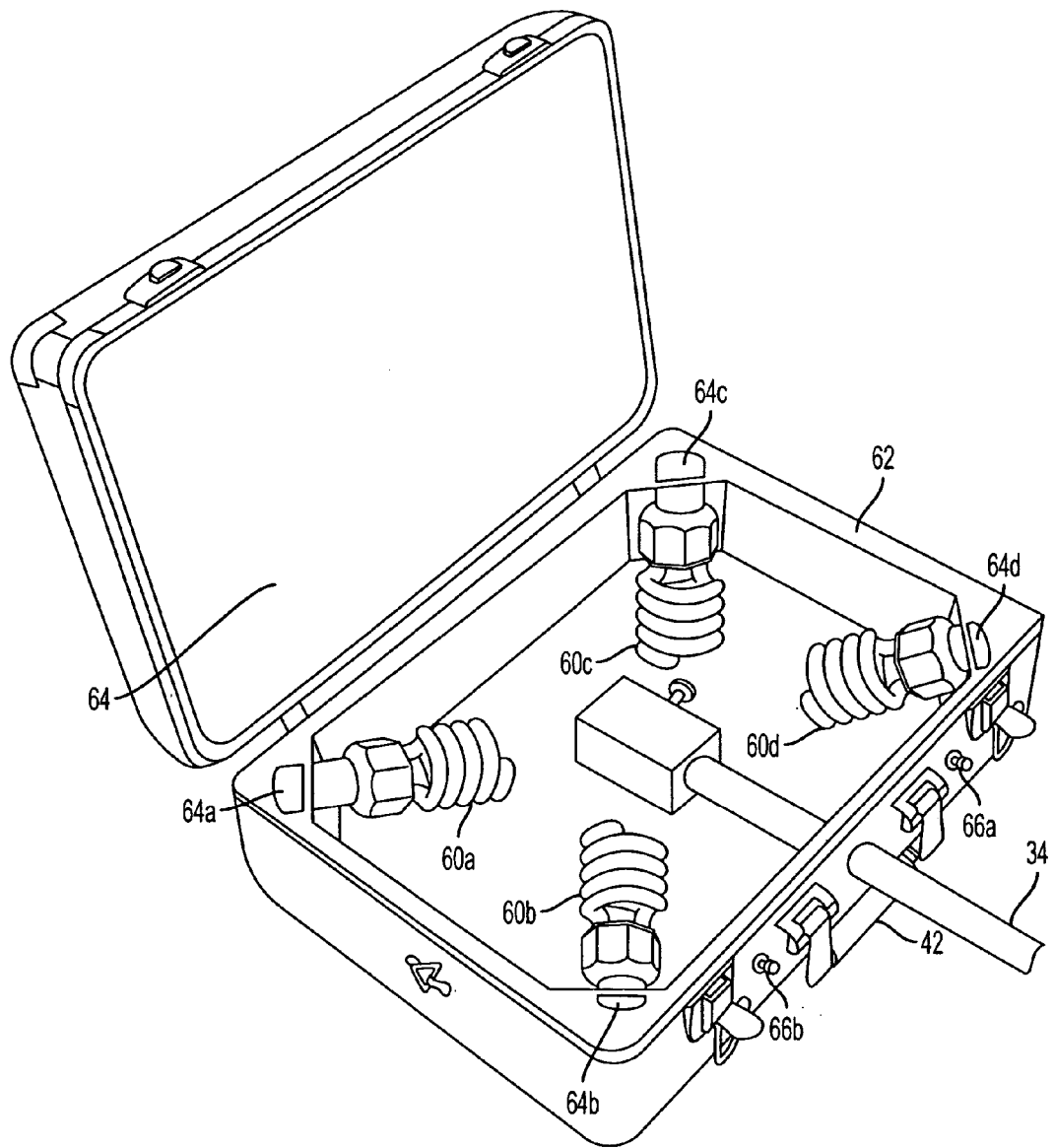
FIG. 18 is a top perspective view of a portable embodiment of the invention.
Figure 19:
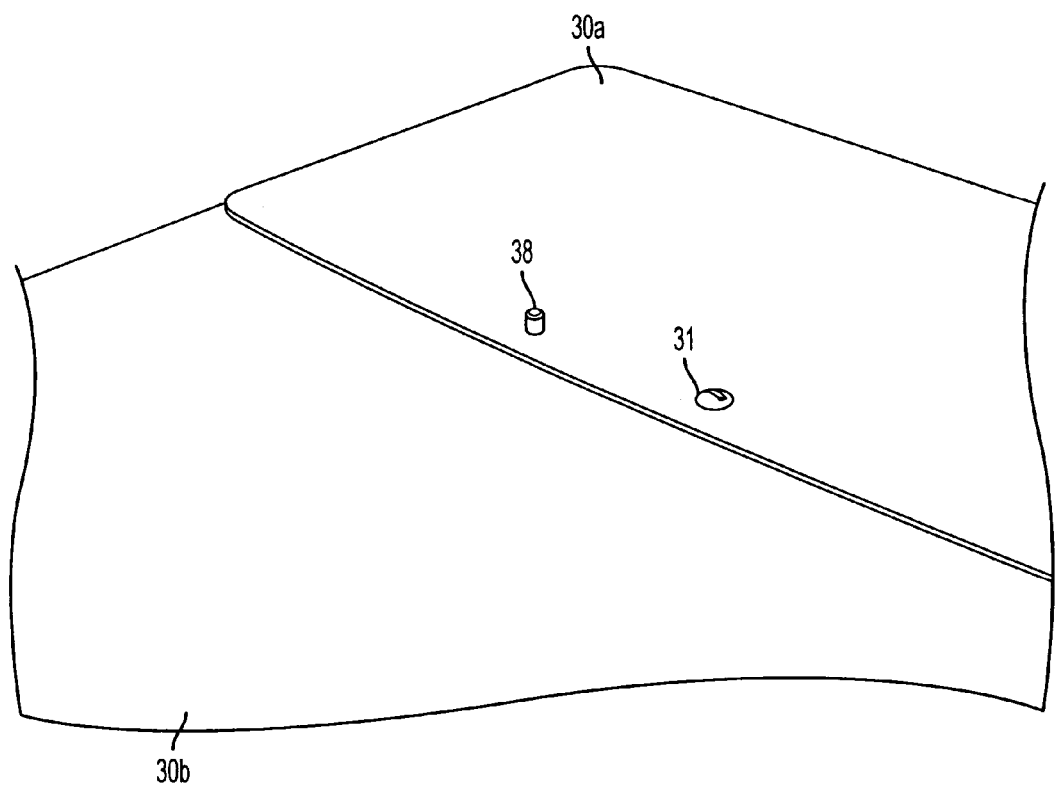
FIG. 19 is front sectional view of the front diffuser showing detail of the parts.
Figure 20:
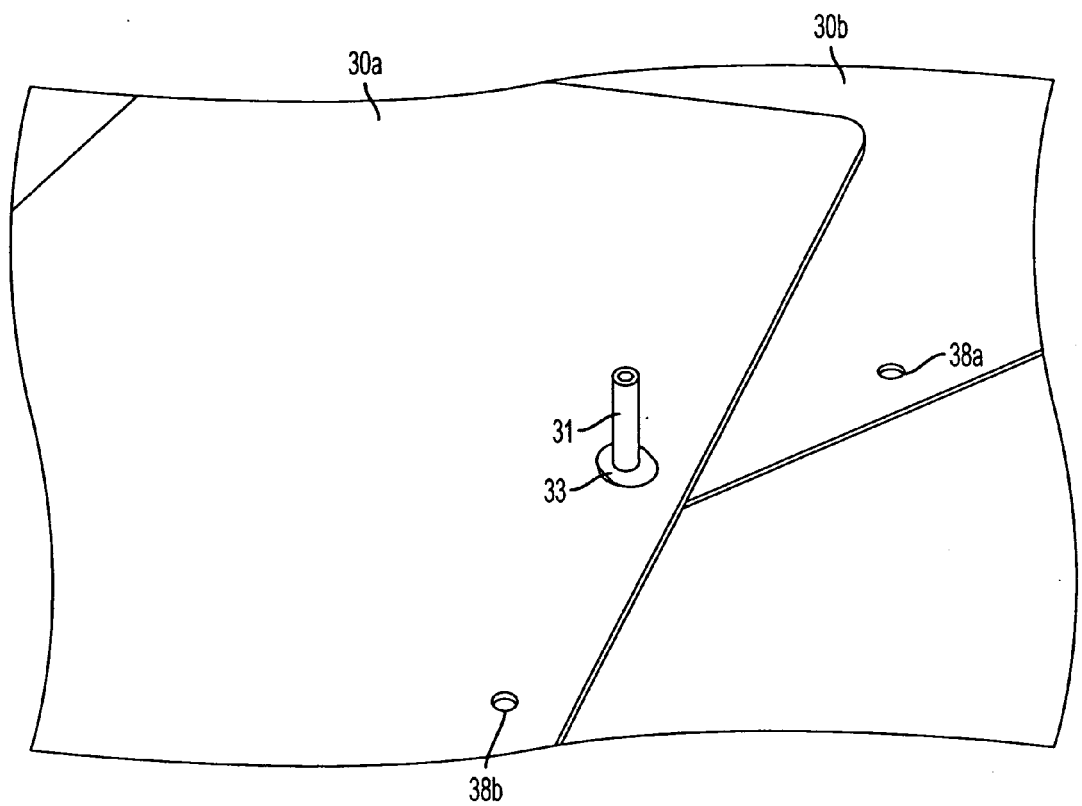
FIG. 20 is a back sectional view of the front diffuser showing detail of the parts.
Figure 21:
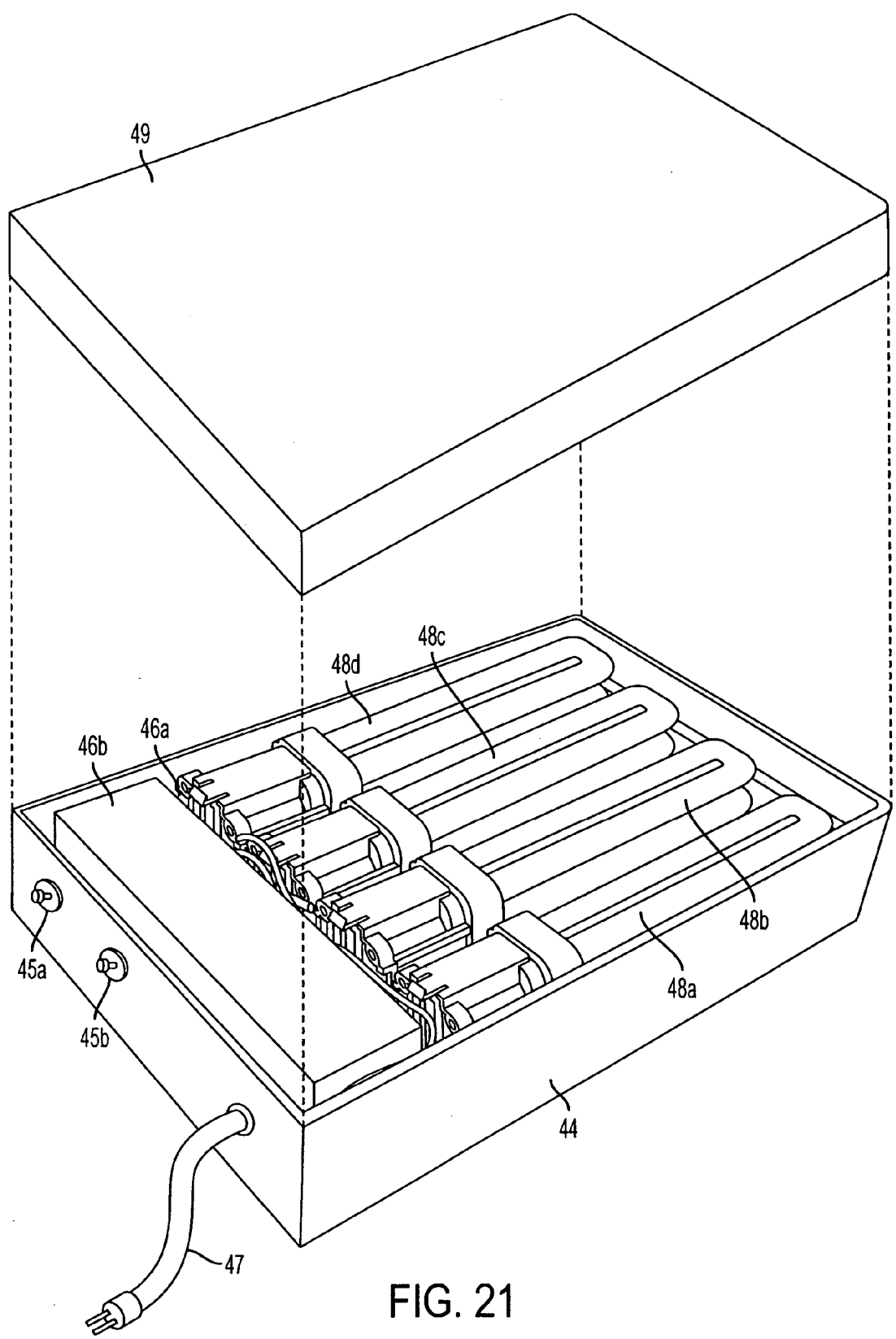
FIG. 21 is a top perspective view of a second additional embodiment of the selectable light source.
Figure 22:
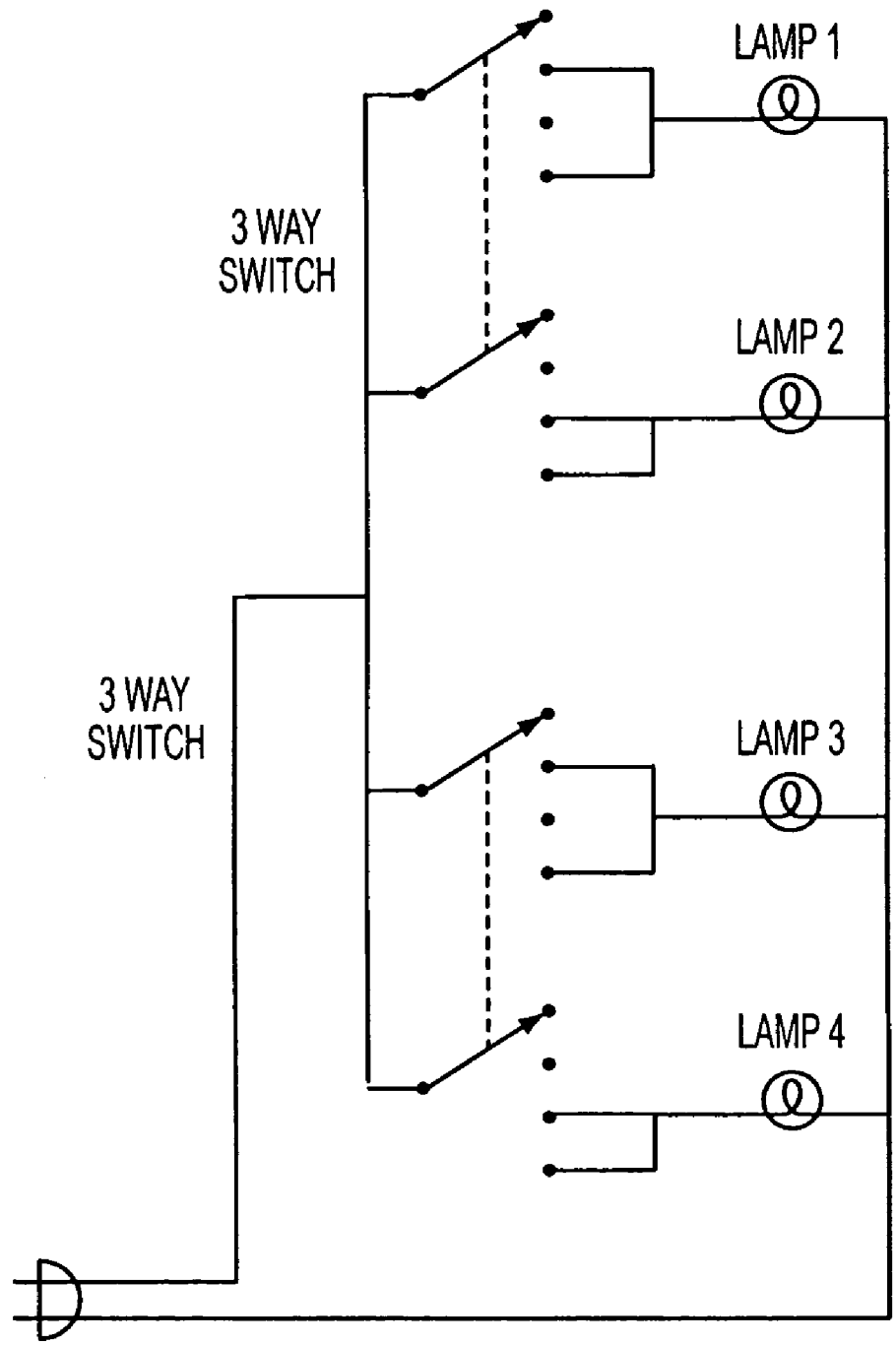
FIG. 22 shows the schematic for the switch for the selectable light source.
Figure 23:
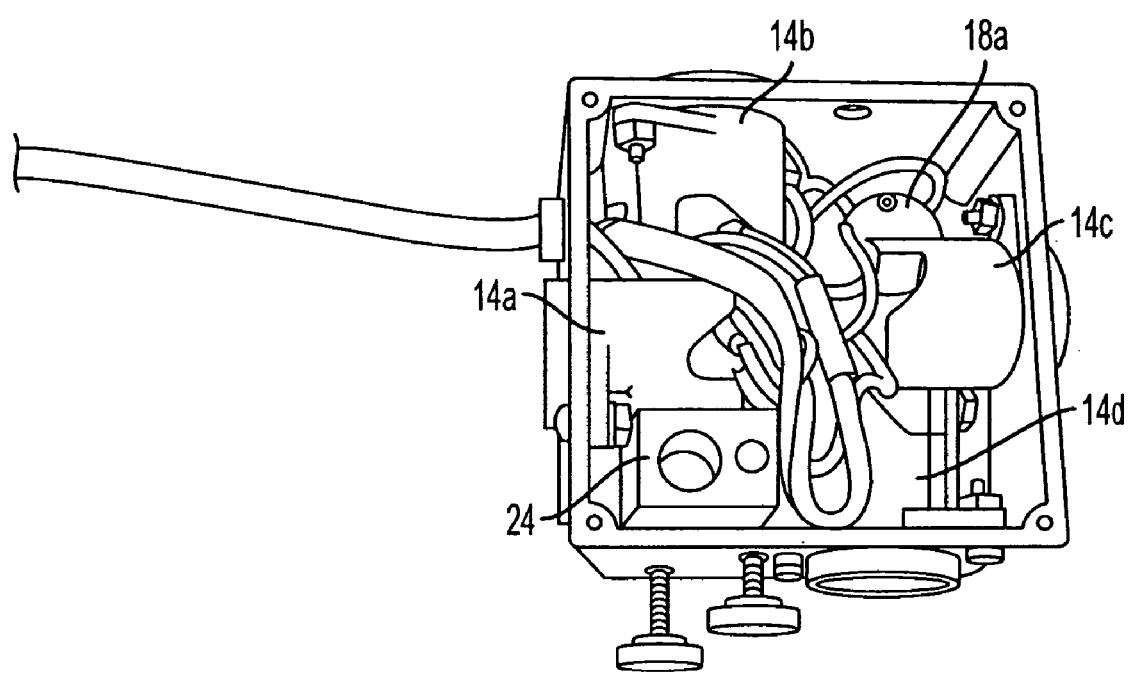
FIG. 23 shows the wiring and connections for the circuitry for the selectable light source.
Figure 24:
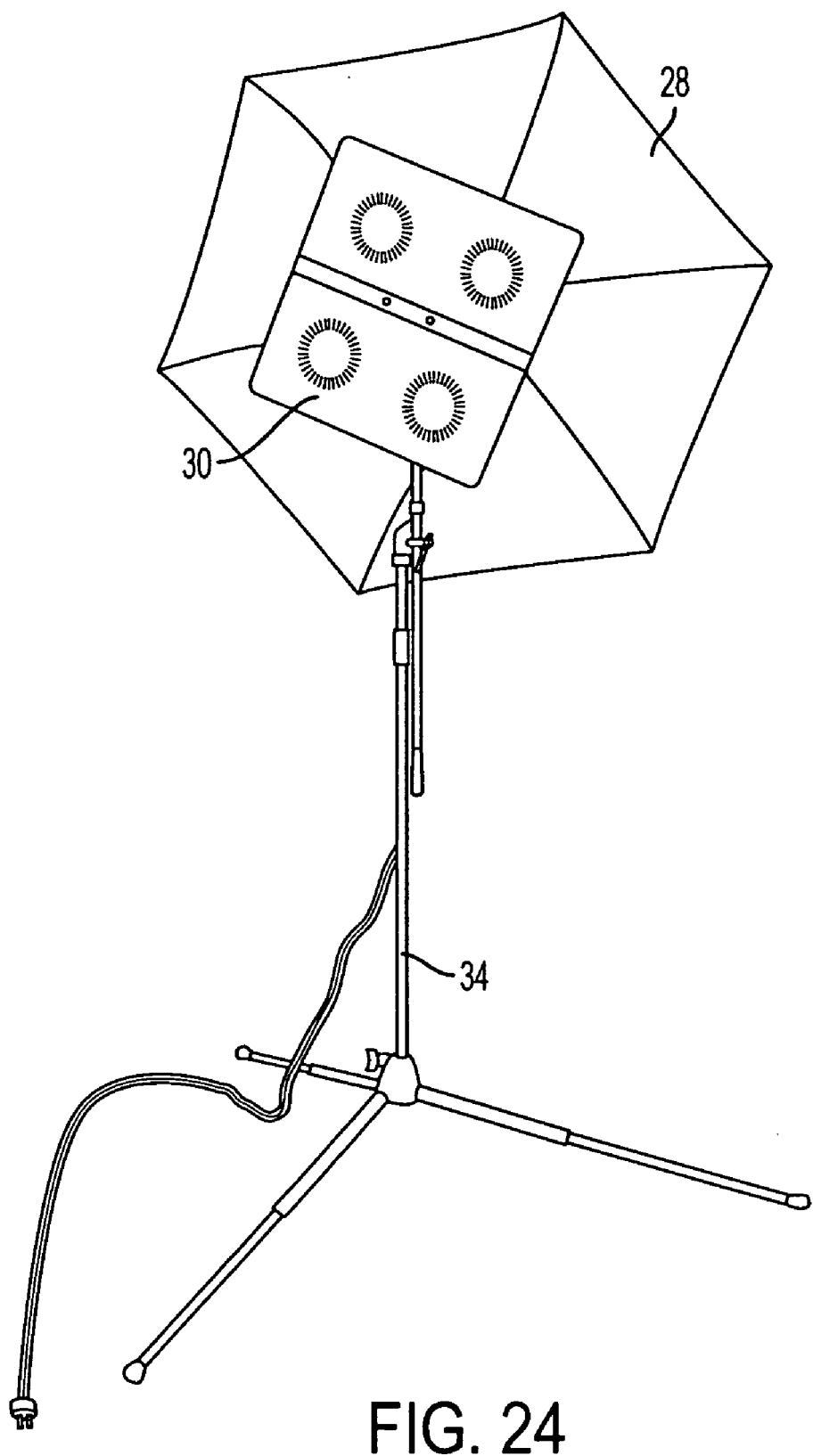
FIG. 24 shows a front view of the front diffuser, umbrella deflector and tripod.
Figure 25:
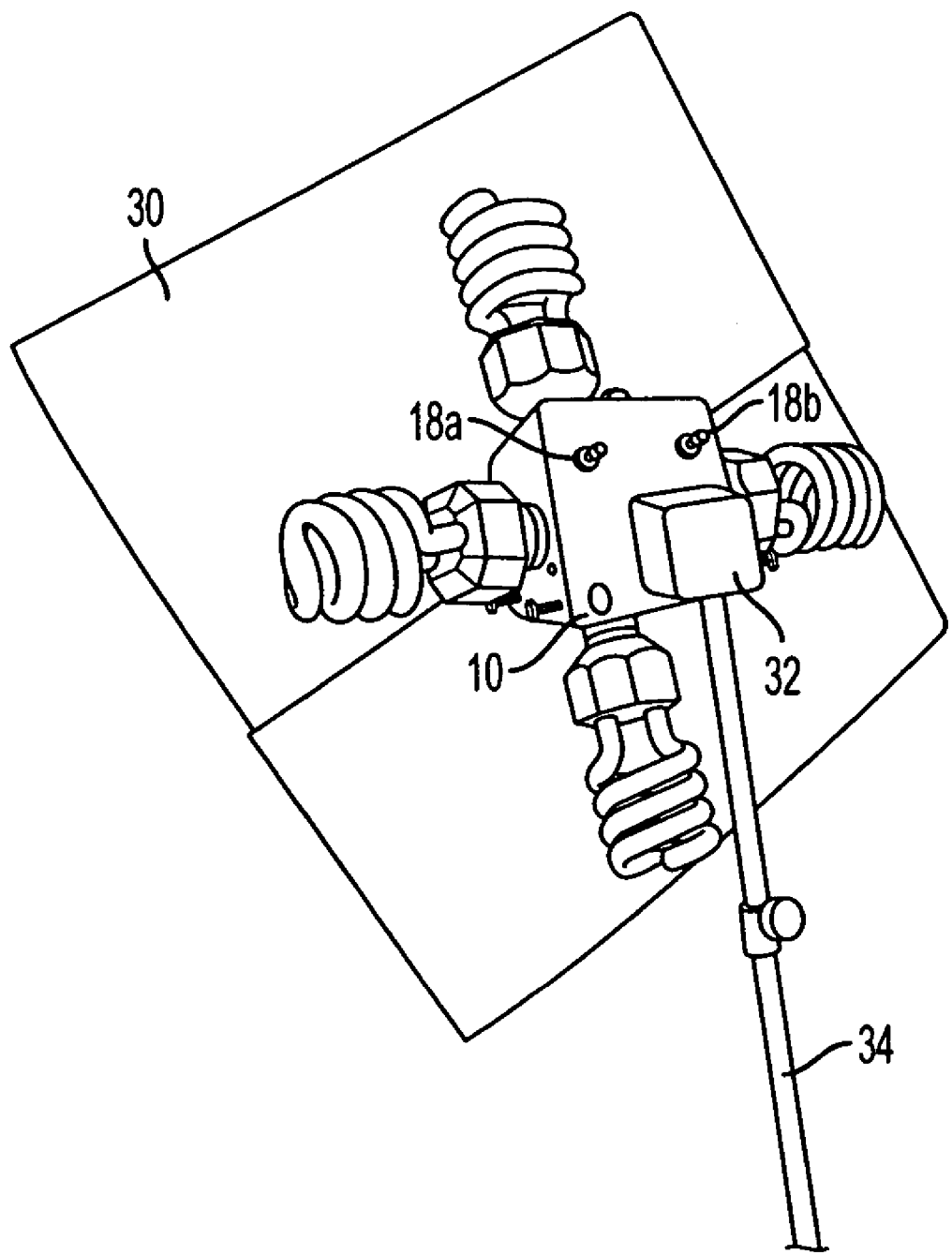
FIG. 25 shows a back perspective view of the selectable light source and front diffuser.
Figure 26:
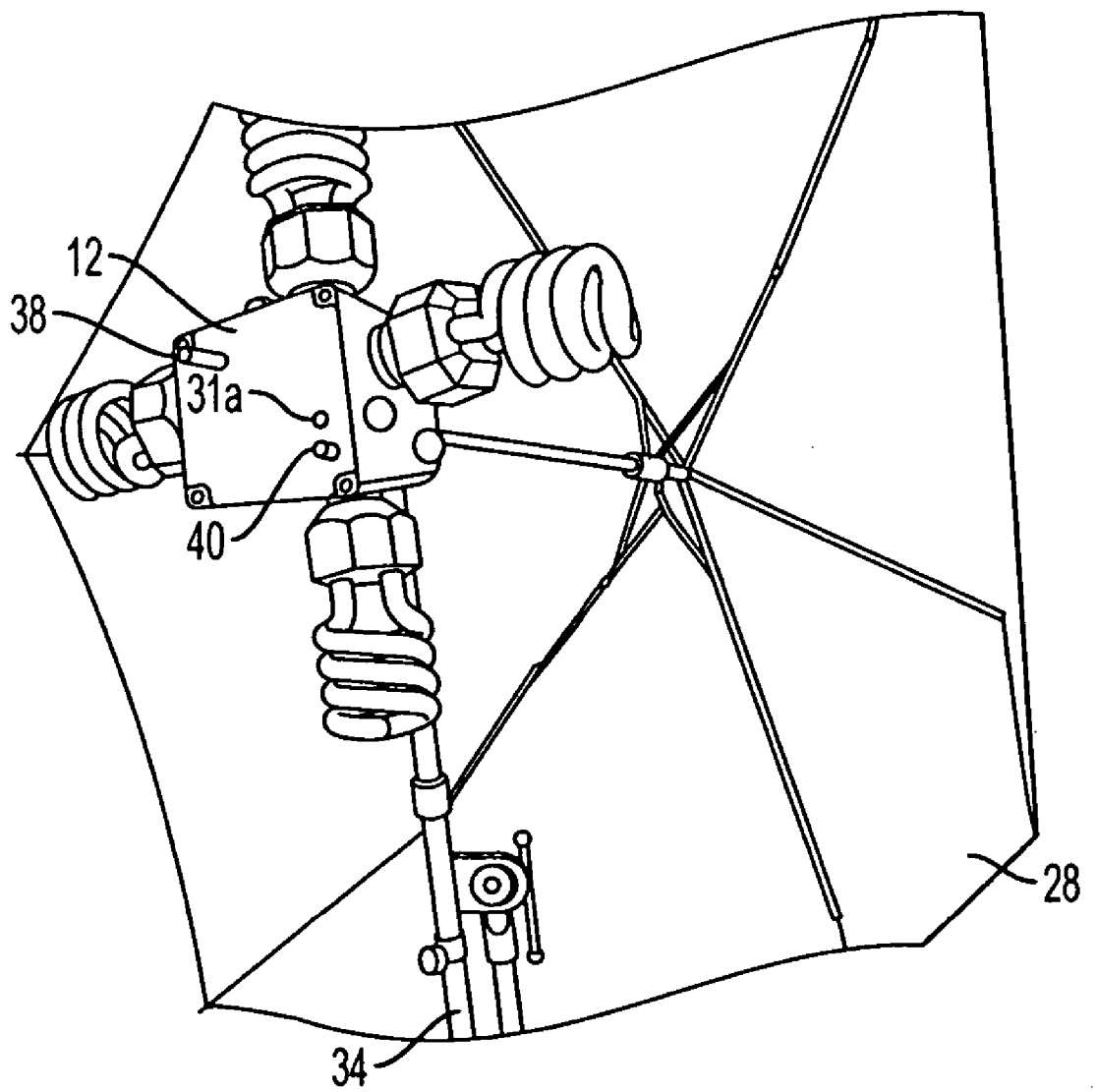
FIG. 26 shows a sectional front perspective view of the selectable light source, umbrella reflector and tripod showing detail.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The preferred embodiment of the present invention is comprised of the following:

A selectable light source further comprising:

A 4"×4"×2.5" PVC electric junction box (10) and cover (12) that house four medium screw base candelabra light bulb sockets(14a, 14b, 14c, 14d). The design of the junction box (10) and cover (12), mounting block (24), thumbscrews (36) and mounted accessories (28, 30, 34) is such that metallic accessories such as the umbrella (28), diffuser (30), tripod (34) or thumbscrews (36) cannot come in contact with the internal wiring. An umbrella shaft thru-hole (28a) is disposed in the cover (12) and junction box (10). A diffuser hole (31a) is disposed in the cover (12) for releasably attaching the diffuser (30), using a steel shaft (31) and locating pin (38).

Four compact fluorescent light bulbs (16a, 16b, 16c, 16d), which are screwed into the sockets. Each bulb is a different color temperature such as, but not limited to: DAYLIGHT 6400K, TRUETONE 5000K, COOL WHITE 4100K and WARM WHITE 3700K.

Two 3-way rotary electric switches (18a, 18b) and wiring control power to the four lights. Each switch controls two lights with the user being able to select light A or light B or light A & B or both lights off. With this two switch arrangement a user can turn on 1, 2, 3 or 4 bulbs (16a, 16b, 16c, 16d) in any combination. A schematic in the drawings shows the wiring arrangement.

A polarized two-prong two conductor power cord (20) to supply 110 volt household electricity to the switches enters the PVC box (12) through a "feed-through" plastic grommet (22).

A PVC block (24) with feed through holes is mounted inside the junction box to provide a sturdy means of attaching the umbrella reflector (28) and the translucent diffuser (30).

A second PVC block (32), with a long hole that fits the tripod boom shaft (34), is mounted on the exterior surface of the junction box.

Thumbscrews (36) are provided to hold the umbrella, diffuser and tripod in place.

The PVC blocks (24, 32) contain brass threaded inserts that provide a durable surface for the operation of the thumbscrews.

A translucent diffuser (30) that is constructed of two sections (30*a* and 30*b*) that are held together with a steel shaft (31) and spring push nut (33). The translucent diffuser (30) is kept open and in the proper position with a locating pin (38) mounted to the junction box cover (12). When not used the diffuser collapses for storage.

A tripod (34) for support of the selectable light source, front diffuser and umbrella reflector.

An umbrella (28) for the preferred embodiment is a standard compact umbrella with white fabric. The shaft of the umbrella is filled with a hardened plastic (40) to prevent collapse under the pressure of the thumbscrew (36).

A padded business case (42) is operable for neat stowing of the selectable light source, diffuser (30), power cord (20) and umbrella (28).

An alternate embodiment of the invention is designed to be a compact version. This embodiment is comprised of a specially molded plastic case (44) which houses, two 3-way switches (45*a*, 45*b*), two transformers (46*a*, 46*b*), a power cord (47), four twin tube compact fluorescent bulbs (48*a*, 48*b*, 48*c*, 48*d*) of four color temperatures. Each bulb is a different color temperature including: DAYLIGHT 6400K*, TRUETONE 5000K*, COOL WHITE 4100K* and WARM WHITE 3700K*. An optional translucent plastic cover (49) provides diffusion if needed.

Another embodiment of the invention is the floodlight version and is similar in concept to the previous versions except that it uses four compact fluorescent floodlight bulbs (50*a*, 50*b*, 50*c*, 50*d*) of four color temperatures. Each bulb is a different color temperature including: DAYLIGHT 6400K*, TRUETONE 5000K*, COOL WHITE 4100K* and WARM WHITE 3700K*. Using floodlights eliminates the need for a separate diffuser or reflector. The PVC housing (S2) is much longer to accommodate the medium screw base candelabra light bulb sockets (54*a*, 54*b*, 54*c*, 54*d*) and bulbs (50*a*, 50*b*, 50*c*, 50*d*). The switches (56*a*, 56*b*) are of the same type 3-way rotary switches and are wired in the same manner as the original design.

In still another embodiment of the invention a compact case is used. It is similar in concept except it uses 4 compact fluorescent bulbs (60*a* 60*b*, 60*c*, 60*d*) of four color temperatures that are mounted inside a carrying case (62). Each bulb is a different color temperature including: DAYLIGHT 6400K*, TRUETONE 5000K*, COOL WHITE 4100K* and WARM WHITE 3700K*. Mounting the bulbs inside a case eliminates the need for a separate diffuser and reflector. The case acts as a reflector and the top of the case (64) is translucent or it can be removed for no diffusion. The case (62) is large enough to accommodate the medium screw base candelabra light bulb sockets (64*a*, 64*b*, 64*c*, 64*d*) and bulbs (60*a*, 60*b*, 60*c*, 60*d*) and wiring. The switches (66*a*, 66*b*) are of the same type 3-way rotary switches and are wired in the same manner as the original design. The case also contains mounted blocks that provide for the secure attachment of a tripod.

I claim:

1. A light source device comprising:
   a light source assembly, wherein said light source assembly is comprised of a plurality of compact fluorescent light bulbs possessing different color temperatures, and wherein said light source assembly is operable for selectively lighting said plurality of compact fluorescent light bulbs;
   a tripod assembly connected to said light source assembly;
   a translucent diffuser assembly connected to said light source assembly; and
   an umbrella assembly connected to said light source assembly,
   wherein said plurality of compact fluorescent light bulbs is selected from the group comprised of a DAYLIGHT 6400K bulb, a TRUETONE 5000K bulb, a COOL WHITE 4100K bulb and a WARM WHITE 3700K bulb.

2. The light source device of claim 1, further comprising a carrying case assembly operable for storing said light source device.

* * * * *